(12) United States Patent
Powelson et al.

(10) Patent No.: US 9,360,335 B1
(45) Date of Patent: Jun. 7, 2016

(54) DYNAMIC REROUTING DURING NAVIGATION

(71) Applicant: GOOGLE INC., Mountain View, CA (US)

(72) Inventors: Lawrence Howard Powelson, Seattle, WA (US); Will Stoltzman, Seattle, WA (US)

(73) Assignee: GOOGLE INC., Mountain View, CA (US)

( * ) Notice: Subject to any disclaimer, the term of this patent is extended or adjusted under 35 U.S.C. 154(b) by 254 days.

(21) Appl. No.: 14/033,032

(22) Filed: Sep. 20, 2013

Related U.S. Application Data

(60) Provisional application No. 61/844,318, filed on Jul. 9, 2013.

(51) Int. Cl.
*G01C 21/34* (2006.01)
*G08G 1/052* (2006.01)
*G08G 1/01* (2006.01)

(52) U.S. Cl.
CPC .................................. *G01C 21/3415* (2013.01)

(58) Field of Classification Search
CPC ........... G01C 21/3492; G01C 21/3415; G08G 1/052; G08G 1/10104
USPC ......................................................... 701/414
See application file for complete search history.

(56) References Cited

U.S. PATENT DOCUMENTS

| | | | | |
|---|---|---|---|---|
| 6,466,866 | B1 * | 10/2002 | Sato | 701/416 |
| 6,574,552 | B2 | 6/2003 | Yano et al. | |
| 7,526,377 | B2 | 4/2009 | Wiener et al. | |
| 7,590,490 | B2 | 9/2009 | Clark | |
| 7,873,471 | B2 | 1/2011 | Gieseke | |
| 7,945,386 | B2 | 5/2011 | Lokshin et al. | |
| 2007/0106465 | A1 | 5/2007 | Adam et al. | |
| 2009/0005962 | A1 | 1/2009 | Shinto | |
| 2010/0185382 | A1 * | 7/2010 | Barker et al. | 701/119 |
| 2010/0268460 | A1 | 10/2010 | Wan et al. | |
| 2011/0224898 | A1 * | 9/2011 | Scofield et al. | 701/200 |
| 2011/0264366 | A1 | 10/2011 | Cabral | |
| 2012/0166076 | A1 * | 6/2012 | Hardy | 701/414 |
| 2012/0316772 | A1 | 12/2012 | Han et al. | |

* cited by examiner

*Primary Examiner* — Fadey Jabr
*Assistant Examiner* — Basil T Jos
(74) *Attorney, Agent, or Firm* — Marshall, Gerstein & Borun LLP (57) ABSTRACT

Initial navigation directions are generated to guide a vehicle along an initial route between an origin and a destination. When the vehicle is a certain location disposed along the initial route, an alternate route to the destination is determined, such that the alternate route and the initial route diverge at a point of divergence between the current location of the vehicle and the destination. Boundaries of an announcement window within which the alternate route can be suggested are determined in view of a current speed of the vehicle. When the point of divergence is within the announcement window, generating, by the one or more processors, an interactive prompt to suggest that the alternate route be selected, such that the interactive prompt is not generated when the point of divergence is outside the announcement window.

21 Claims, 4 Drawing Sheets

DYNAMIC REROUTING DURING NAVIGATION

CROSS-REFERENCE TO RELATED APPLICATION

This application claims priority to U.S. Provisional Patent Application No. 61/844,318, filed on Jul. 9, 2013, and entitled "Dynamic Rerouting During Navigation," the entire disclosure of which is hereby expressly incorporated by reference herein.

FIELD OF THE DISCLOSURE

The present disclosure relates to interactive digital maps for navigation and, more particularly, to providing a technique for dynamic rerouting during an ongoing navigation session.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, various computing devices, such as mobile phones, laptop and tablet computers, car navigation systems, handheld global positioning system (GPS) units, etc. support software applications that display interactive digital maps ("mapping applications"). The mapping applications may display a variety of map content, such as topographical data, street and road data, urban transit information, traffic data, weather data, etc. The mapping applications may also receive navigation queries from users, such as requests for directions to between an origin and a destination, and display navigation routes on a digital map.

However, due to changing traffic, road conditions, weather, etc., a user following a previously selected route may experience unexpected delays and inconveniences. At that time, it is possible that a new route to the destination may become a better option. However, if the mapping application automatically suggests the new route to the user immediately upon discovery, the user may find the suggestion to be intrusive and annoying.

SUMMARY

A method for suggesting a new route to a user is implemented in a computing device such as a smartphone, a tablet computer, a car navigation system, etc. The method includes obtaining navigation directions for navigating the user of the computing device between an origin and a destination. These original navigation directions define an original route. According to the method, updated navigation directions defining an updated route are periodically obtained as the user moves (e.g., drives) toward the destination. For example, updated navigation directions can be obtained every minute. Due to changing traffic conditions, the updated navigation directions may not coincide with the original navigation directions for the remaining of the trip to the destination. Accordingly, the method includes determining whether there is a point of divergence between the original route and the updated route within a certain window, the boundaries of which can be expressed in terms of time, distance, or both.

According to one implementation, the window has a leading edge and a trailing edge, such that the leading edge corresponds to a projected position of the computing device after a first predefined period of time (e.g., 120 seconds), and the trailing edge corresponds a projected position of the computing device after a second predefined period of time (e.g., 600 seconds). The projected position of the computing device can be computed based on the current speed at which the user is driving or otherwise moving. If it is determined that there is a point of divergence between the routes within the window, the method includes determining a projected amount of time the user of the computing device will save by following the second route to the destination. If the projected amount of saved time is above a threshold value (e.g., 300 seconds), an interactive prompt suggesting that the user select the updated navigation directions is displayed, according to the method. If the user select the updated route via the prompt, navigation guidance continues along the updated route.

An example embodiment of the techniques of the present disclosure is a method for providing dynamic rerouting notifications. The method is executed on one or more processors and includes generating initial navigation directions to guide a vehicle along an initial route between an origin and a destination. The method also includes determining the boundaries of an announcement window within which the alternate route can be suggested, in view of a current speed of the vehicle and, when the point of divergence is within the announcement window, generating an interactive prompt to suggest that the alternate route be selected, where no interactive prompt is generated when the point of divergence is outside the announcement window.

Another example embodiment is a non-transitory computer-readable medium that stores instructions for providing dynamic rerouting notifications. When executed on one or more processors, the instructions cause the one or more processors to (i) generate initial navigation directions to guide a vehicle along an initial route between an origin and a destination, (ii) when the vehicle is at a current location on the initial route, determine an alternate route to the destination, such that the alternate route and the initial route diverge at a point of divergence between the current location and the destination, and (iii) determine boundaries of an announcement window within which the alternate route can be suggested, in view of a current speed of the vehicle, and (iv) when the point of divergence is within the announcement window, generate an interactive prompt to suggest that the alternate route be selected, where no interactive prompt is generated when the point of divergence is outside the announcement window.

Still another example embodiment is a computing device including a user interface configured to receive user input and provide output, one or more processors, and a non-transitory computer-readable medium storing thereon instructions for providing dynamic rerouting notifications. When executed on one or more processors, the instructions cause the computing device to (i) generate initial navigation directions to guide a vehicle along an initial route between an origin and a destination; (ii) when the vehicle is at a current location on the initial route, determine an alternate route to the destination, such that the alternate route and the initial route diverge at a point of divergence between the current location and the destination, (iii) determine boundaries of an announcement window within which the alternate route can be suggested, in view of a current speed of the vehicle, and (iv) when the point of divergence is within the announcement window, generate an interactive prompt to suggest that the alternate route be selected, where no interactive prompt is generated when the point of divergence is outside the announcement window

DETAILED DESCRIPTION

Generally speaking, a navigation application executing on a computing device can use the techniques of the present disclosure to provide dynamic rerouting during an ongoing navigation session. In an example scenario, the user of the computing device (e.g., a smartphone) requests and receives navigation directions for traveling to a destination and begins to drive along the specified route in accordance with the received directions. The navigation application dynamically determines when rerouting should be triggered as the computing device travels along the selected route. If the navigation application determines that an alternate route is available and that rerouting is advisable in view of projected time savings, the navigation application determines whether the computing device will reach the point of divergence between the current route and the alternate route within a certain time "window." The leading and trailing edges of the window can be expressed in terms of the number of seconds, for example. When the point of divergence is within the window, the navigation application generates a prompt suggesting to the user that the alternate route be selected.

To compare the alternate route to the currently selected route, the navigation application analyzes each route as a polyline made up of discrete points. According to some implementations, when the points begin to diverge within the window, the navigation application starts measuring the projected time savings that can be obtained by traveling along the alternate route. The navigation application will only suggest the alternate route if the projected time savings is found to be significant (e.g., if the time savings exceeds a certain threshold). In one such implementation, the navigation application further considers the degree of divergence between the previously selected route and the alternate route prior to suggesting the alternate route.

Figure 1:
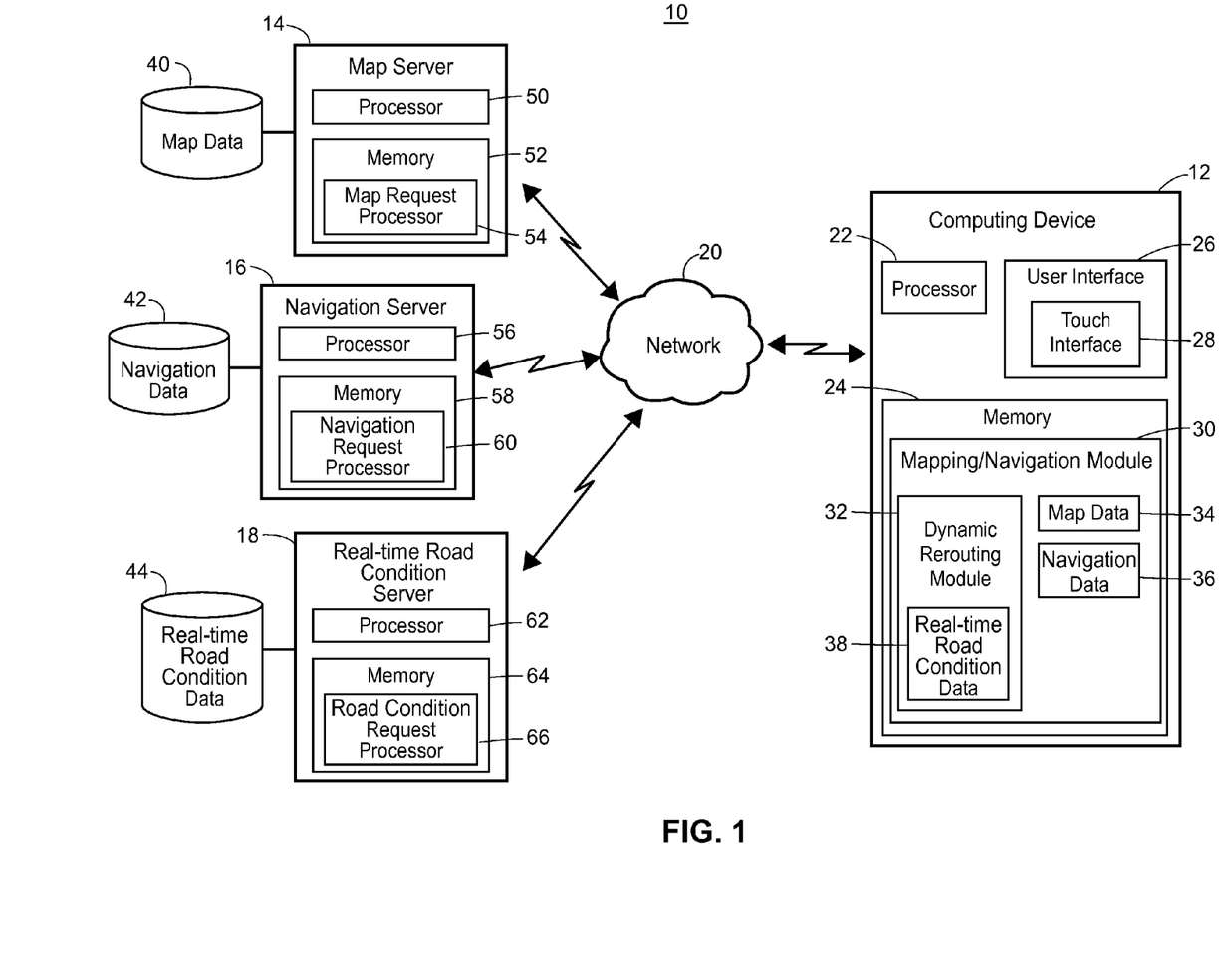
FIG. 1 is a block diagram of an example system in which techniques for providing dynamic rerouting during an ongoing navigation session are implemented.

Referring first to FIG. 1, a system 10 includes an example computing device 12 that implements at least some of the techniques for providing dynamic rerouting of the present disclosure. The computing device 12 is coupled to a map server 14, a navigation server 16, and a real-time road condition server 18 via a communication network 20 that can include wired and/or wireless links. The computing device 12 can be, for example, a smartphone, a tablet computer, a personal digital assistant, a navigation device mounted in a vehicle, or a laptop computer.

In the implementation illustrated in FIG. 1, the computing device 12 includes one or more processors 22 such as central processing units (CPUs), a computer-readable memory 24, and a user interface 26 including a touch interface or touchscreen 28. More generally, the computing device 12 can include one or more processors and, if desired, one or more graphics processing units (GPUs) as well as other processing units. The memory 24 can be a computer-readable, tangible, non-transitory storage device and can include both persistent (e.g., a hard disk, a flash drive) and non-persistent (e.g., RAM) memory components. The memory 24 stores instructions executable on the processor 22 that make up a mapping/navigation software module 30. In this example configuration, the mapping/navigation software module 30 performs both mapping and navigation operations. In other configurations, however, the memory 24 may include separate mapping and navigation software modules to handle mapping and navigation, respectively. The mapping/navigation software module 30 also includes a dynamic rerouting module 32, which may be provided as an integral part of the mapping/navigation software module 30 or as a separately installable and downloadable component. In addition, the memory 24 stores map data 34, navigation data 36, and real-time road condition data 38 on which the mapping/navigation module 30 and the dynamic rerouting module 32 operate.

Because the dynamic rerouting module 32 in operation accesses the map data 34 and the navigation data 36 to determine the current location, the locations of point(s) of divergence along the route, the time available until the next guidance event, etc., the dynamic rerouting module 32 in some implementations controls the memory regions in which the map data 34 and the navigation data 36 are stored. In a sense, the map data 34 and the navigation data 36 in these implementations are disposed "inside" the dynamic rerouting module 32.

The mapping/navigation software module 30 according to various implementations is a separately executable software application, a plugin or an extension that provides additional functionality to another software application such as a web browser, etc. The instructions that make up the mapping/navigation module 30 may be compiled and executable on the processor 22 directly, or not compiled and interpreted by another software application at runtime.

In operation, the mapping/navigation module 30 generates requests for map data in accordance with how the user positions the viewport using pan, zoom, and other controls. A request for map data can specify, for example, the geographic area for which the computing device 12 will display a digital map, the zoom level, the desired layers of additional information (e.g., traffic, weather, satellite imagery, etc.). The computing device 12 transmits the requests to the map server 14. In response, the map server 14 retrieves map data from a map database 40 and provides the map data to the computing device 12 via the network 20. The computing device 12 then stores the received map data in the memory 24 as the map data 34. The mapping/navigation software module 30 generates a digital map using the map data 34 and, when necessary, requests new map data in response to user input (e.g., pan operations, zoom operations) received via the user interface 26.

When interacting with the digital map, the user may submit requests for navigation directions (e.g., driving directions, walking directions, biking directions, etc.) to go from a starting location to a destination location. In submitting the navigation requests, the user may specify various preferences such as requesting a route with the shortest distance to the destination, a route that will reach the destination in the shortest amount of time, a route that avoids highways or tolls, etc. For example, the user may submit a request for driving directions to go from the user's home to a shopping mall in the shortest amount of time while avoiding highway travel. In any event, the mapping/navigation module 30 formats a navigation request, transmits the navigation request to the navigation server 16 coupled to a navigation database 42, receives the navigation data 36, and displays an appropriate navigation route on the map. Continuing with the previous example, the displayed navigation route may be a series of turn-by-turn driving directions that leads the user from the user's home to the shopping mall.

Depending on the implementation, the map data 34 may be in a raster format, such as Portable Network Graphics (PNG), a vector graphics format (based on mathematical descriptions of geometric shapes), or any other suitable format. In the vector graphics format, the map data 34 may specify various map elements such as roads, buildings, bodies of water, and other natural and artificial objects visible outside. The map data 34 can also include text-based label data as well as metadata that includes additional information about the map elements. In a raster format, the map elements are typically embedded into the same image of a digital map.

The navigation data 36 may include data specifying a sequence of navigation steps (e.g., directions, line segments, etc.) to be displayed with the map elements to provide, for example, a navigation route from a starting point to a destination point on the digital map. While processing the navigation data 36, the mapping/navigation module 30 may adjust the displayed digital map by requesting new map data. For example, the mapping/navigation module 30 may request new map data to show different parts of the navigation route as the user changes the zoom level, pans across the map, or otherwise interacts with the map. In other implementations or modes of operation, the mapping/navigation module 30 does not request or display map data as the computing device 12 moves along the currently selected route so as to save battery power, for example.

To better aid the user during an ongoing navigation session, the mapping/navigation software module 30 may execute the dynamic rerouting module 32 to perform dynamic rerouting. In an example scenario, a user is following a navigation route generated by the mapping/navigation module 30 for driving a vehicle from the user's home to a destination at an airport. The navigation route may indicate driving on a certain highway that will allow the user to reach the airport in the shortest amount time in the example scenario. While the user is driving on the route, the dynamic rerouting module 32 periodically (e.g., every minute) queries the real-time road condition server 18 to check for current road conditions such as traffic conditions, lane closures, construction delays, accidents, weather alerts, etc. For simplicity, the real-time road condition server 18 is depicted in FIG. 1 as being coupled to a real-time road condition database 44. It will be understood, however, that the system 10 can include a number of real-time road condition servers as well as multiple databases storing various types of road condition data.

The dynamic rerouting module 32 stores information received from the real-time road condition server 18 as the real-time road condition data 38, and analyzes the data 38 to determine whether a new or better route to the destination is needed. When an alternate navigation route is deemed necessary and becomes available, the dynamic rerouting module 32 then determines if there exists a point of divergence between the alternate navigation route and the original navigation route within a navigation window, which is based on the speed at which the vehicle is moving. To find the point of divergence, the dynamic rerouting module 32 analyzes each route as a polyline made up of discrete points. If the points begin to diverge and the point of divergence is within the navigation window, then the dynamic rerouting module 32 determines the amount of traveling time that can be saved or lost by selecting the alternate route. If the amount of traveling time that can be saved is projected to be greater than a predetermined threshold value (e.g., greater than 5 minutes), then the dynamic rerouting module 32 will notify the user of the alternate navigation route.

As an example implementation, the dynamic rerouting module 32 may show the alternate route alongside the original route for comparison. For example, the two routes may be shaded in different colors or have different traffic colorings to indicate their relative traffic flow. The dynamic rerouting module 32 may then generate a rerouting interface to prompt the user to select the alternate route. The rerouting interface may include a brief description of the alternate route and the predicted time savings (e.g., "faster route now available, save 10 minutes via I-280"). The rerouting interface provides options (e.g., two buttons) for the user to either select or not select the alternate route. Selecting the alternate route will automatically reroute the user to use the alternate route, while not selecting the alternate route will keep the user on the original route. Additionally, the dynamic rerouting module 32 will automatically dismiss the rerouting interface after a short period of time (e.g., 30 seconds). During that period of time, the rerouting interface will display a countdown timer, in which failure to act before the timeout will have the same effect as not selecting the alternate route.

On the other hand, the dynamic rerouting module 32 may not notify the user of the alternate navigation route if the projected time savings is less than the predetermined threshold value. This avoids unnecessary interruptions to the user during the navigation session. Further, if the alternate route is deemed unnecessary or unavailable, or if the point of divergence between the alternate route and the original route is not within the navigation window, then the dynamic rerouting module 32 will proceed to keep the user on the original route.

In some implementations, if the user has indicated specific preferences for a navigation route, then the dynamic rerouting module 32 will not suggest an alternate route unless all the specific preferences are met. For example, if the user prefers highway travel without tolls, then the dynamic rerouting module 32 will not notify the user of an available alternate tolled highway even if the dynamic rerouting module 32 determines that traveling on the alternate tolled highway can have significant time savings. As another example, the user may insist traveling the shortest distance to a destination. In this scenario, in addition to determining time savings, the dynamic rerouting module 32 may also calculate distance savings. That is, the dynamic rerouting module 32 may weigh the degree of divergence between a current route and an alternate route against an amount of traveling time that can be saved as well as an amount of distance traveled. Thus, if the amount of traveling distance on the alternate route is greater than that of the current route, then the dynamic rerouting module 32 will not notify the user of the alternate route even if traveling on the alternate route involves significant time savings.

With continued reference to FIG. 1, the map server 14 may include a processor 50 and a memory 52 that stores a map request processor 54, made up of instructions executable on the processor 50. The navigation server 16 similarly may include a processor 56 and a memory 58 that stores a navigation request processor 60, made up of instructions executable on the processor 56. Likewise, the real-time road condition server 18 may include a processor 62 and a memory 64 that stores a road condition request processor 66, made up of instructions executable on the processor 62. According to various implementations, the map server 14, the navigation server 16 and/or the real-time road condition server 18 include one or multiple devices, operate in a distributed or non-distributed manner, are owned by single business entity or different business entities, etc. For the purposes of this discussion, the terms "map server", "navigation server", and/or "real-time road condition server" refer to an individual server device or to a group of two or more server devices.

Figure 2:
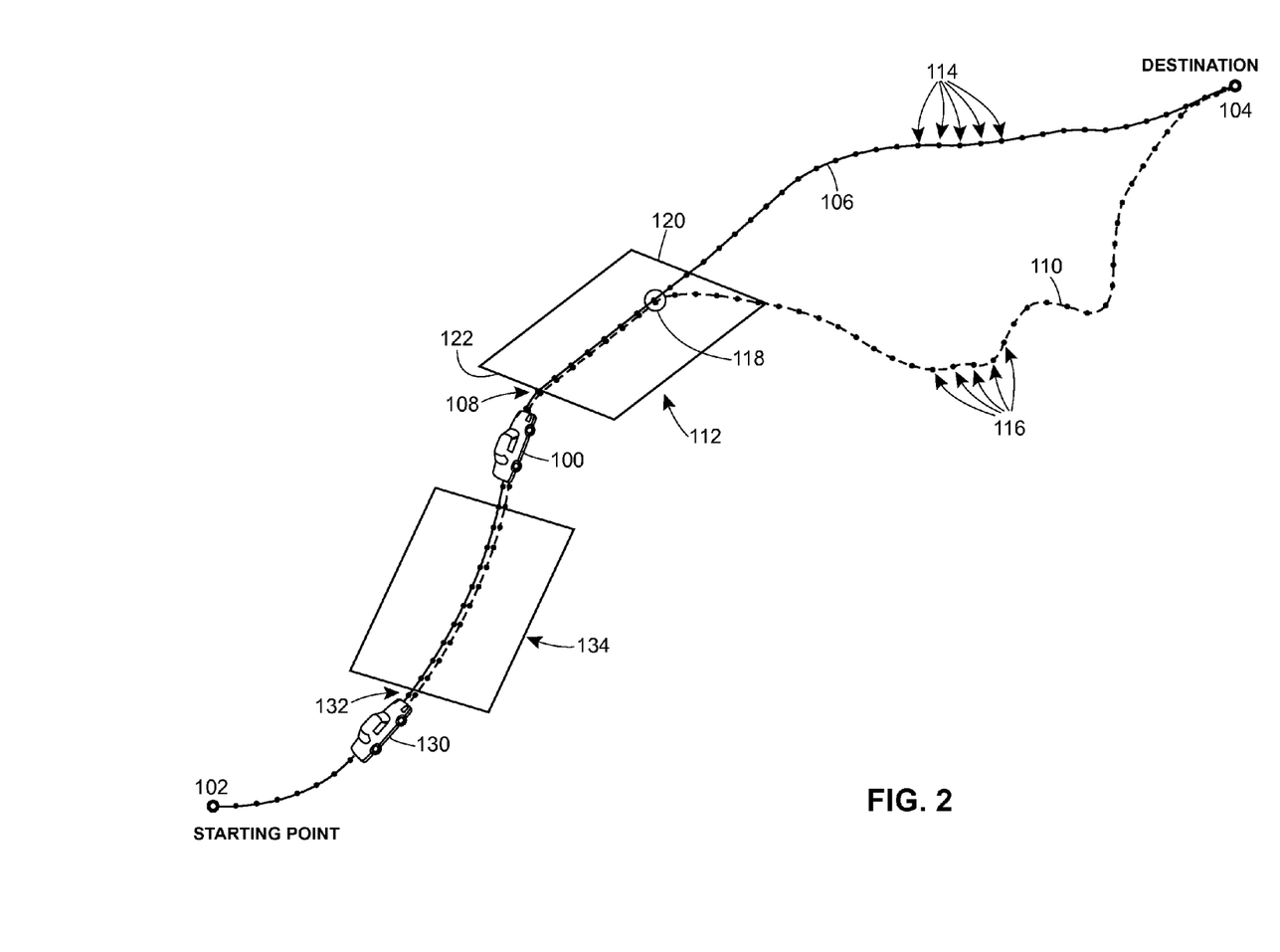
FIG. 2 is a schematic depiction of an ongoing vehicle navigation session in which techniques for providing dynamic rerouting can be implemented.
Figure 3:
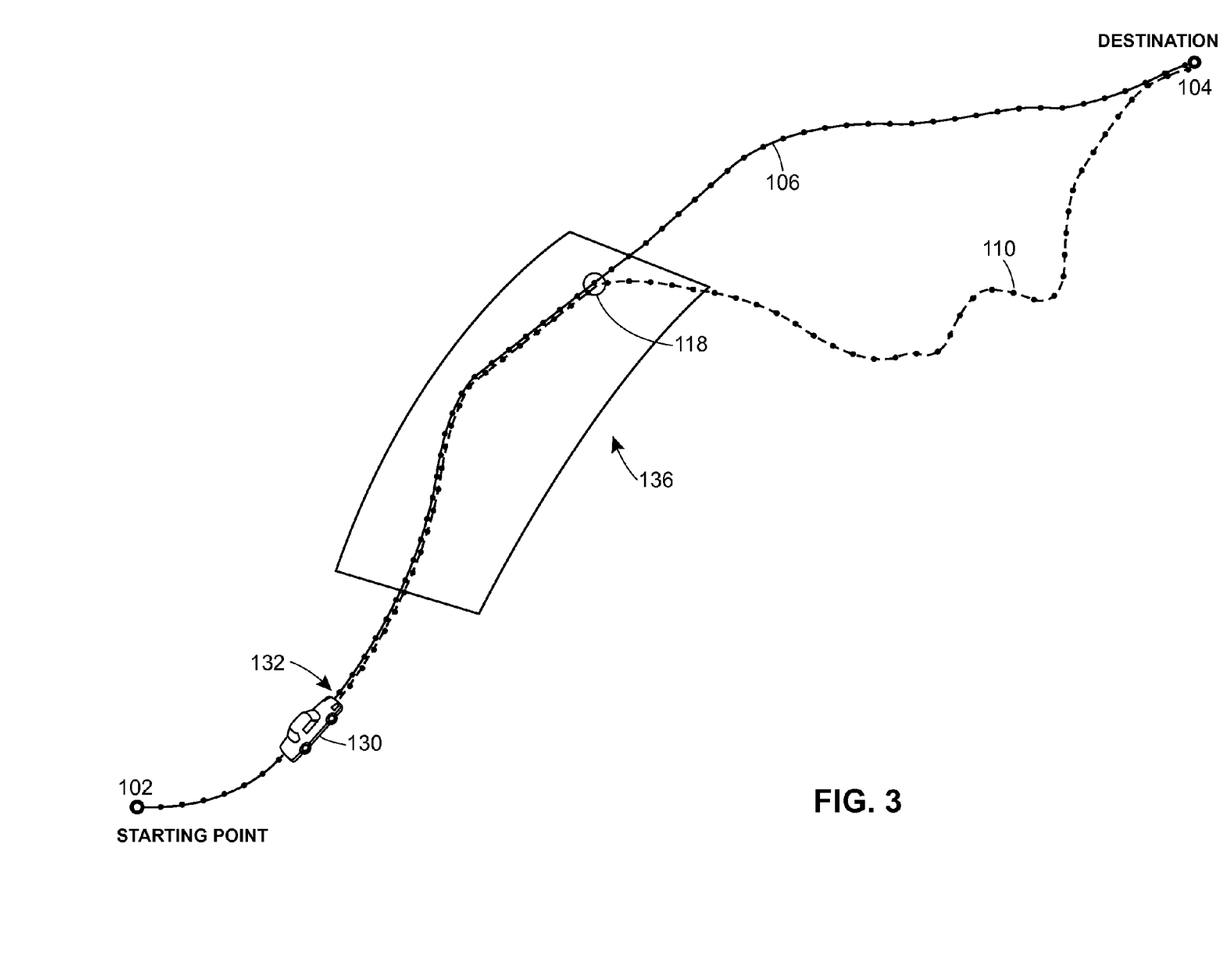
FIG. 3 is another schematic depiction of an ongoing vehicle navigation session in which techniques for providing dynamic rerouting can be implemented.

FIGS. 2 and 3 are considered next. These figures represent schematic depictions of dynamic rerouting during an ongoing vehicle navigation session.

In FIG. 2, a user in a vehicle 100 is driving from a starting point 102 to a destination 104 along a road 106. The vehicle 100 is at a location 108 on the road 106. The user may be using a computing device (e.g., the computing device 12) that runs a navigation software (e.g., the mapping/navigation software module 30 including the dynamic rerouting module 32) to obtain driving directions. The navigation software may generate a navigation route corresponding to the road 106 and provide the user with a series of driving directions that allows the user to navigate from the starting point 102 to the destination 104. In an example scenario, the navigation software performs dynamic rerouting to aid the user during the navigation session. The navigation software periodically checks a traffic database (e.g., the real-time road condition database 18) for current traffic conditions on the road 106. If information from the traffic database indicates that there is significant traffic ahead that would cause delays, then the navigation software will proceed to find an alternate route to the destination 104.

When an alternate route is available (e.g., the road 110) from the current location 108, the navigation software determines whether there exists a point of divergence between the alternate route 110 and the original route 106 within a dynamic rerouting window 112. To do so, the navigation software converts the route 106 into a polyline made up of a series of discrete points 114, and converts the route 110 into another polyline made up of a series of discrete points 116. The navigation software then compares the points 114 and 116 that are within the window 112 to determine a point of divergence 118.

The dynamic rerouting window 112 is a virtual projection of the position of the vehicle 100 on the road 106 based on the speed at which the vehicle 100 is moving. As such, the dynamic rerouting window 112 includes a leading edge 120 that indicates the farthest position of the vehicle 100 on the road 106 after moving at the current speed for a maximum time period (e.g., 600 seconds), and a trailing edge 122 that indicates the nearest position of the vehicle 100 on the road 106 after moving at the current speed for a minimum time period (e.g., 120 seconds). To ensure that the window size is valid, the maximum time period is set to be greater than the minimum time period.

As depicted in FIG. 2, the point of divergence 118 exists within the dynamic rerouting window 112. Therefore, the navigation software proceeds to measure the divergence between the route 106 and the route 110 by comparing the points 114 and 116 that extend from the current location 108 to the destination 104. The degree of divergence between the points 114 and 116 is then weighed against a criterion, which may be, for example, an amount of traveling time that can be saved or lost. Thus, if the amount of traveling time that can be saved is predicted to be greater than a predetermined threshold value (e.g., 5 minutes), then the navigation software will notify the user by suggesting the route 110 as the alternate route to the destination 104.

FIG. 2 also depicts another user in a vehicle 130 which is traveling on the same route 106 at some distance behind the vehicle 100. The vehicle 130 may be at a location 132 on the road 106, but is moving at the same speed as the vehicle 100. The user in the vehicle 130 is also using a computing device that runs a navigation software (which may the same as the navigation software used by the vehicle 100) to navigate from the starting point 102 to the destination 104. Due to traffic conditions on the road 106, the navigation software in the vehicle 130 has determined that the alternate route 110 to the destination 104 is necessary and available. However, the navigation software in the vehicle 130 is using a dynamic rerouting window 134, which does not show the point of divergence 118 because the vehicle 130 is still too far away. Thus, the navigation software in the vehicle 130 does not proceed to measure the divergence between the route 106 and the route 110. Instead, the navigation software in the vehicle 130 keeps the user on the route 106 until the point of divergence 118 is within the dynamic rerouting window 134. This ensures that the user is not notified too early of the alternate route 110 because there will be no clear immediate effect. Similarly, to ensure that the user is not notified too late or interrupted during a dangerous time, once the point of divergence 118 appears within the dynamic rerouting window 134, the navigation software in the vehicle 130 will notify the user well before the vehicle 130 has reached the point of divergence 118. This allows the user in the vehicle 130 enough time to act and prevents any unnecessary panic.

In FIG. 3, the user in the vehicle 130 is moving at a faster speed. As a result, the navigation software in the vehicle 130 is now using a dynamic rerouting window 136, which indicates that the vehicle 130 will be at farther positions along the road 106 when moving at the faster speed. Consequently, the point of divergence 118 is within the dynamic rerouting window 136, and the navigation software in the vehicle 130 will proceed to measure the divergence between the routes 106 and 110, and determine whether or not to notify the user of the alternate route 110.

Figure 4:
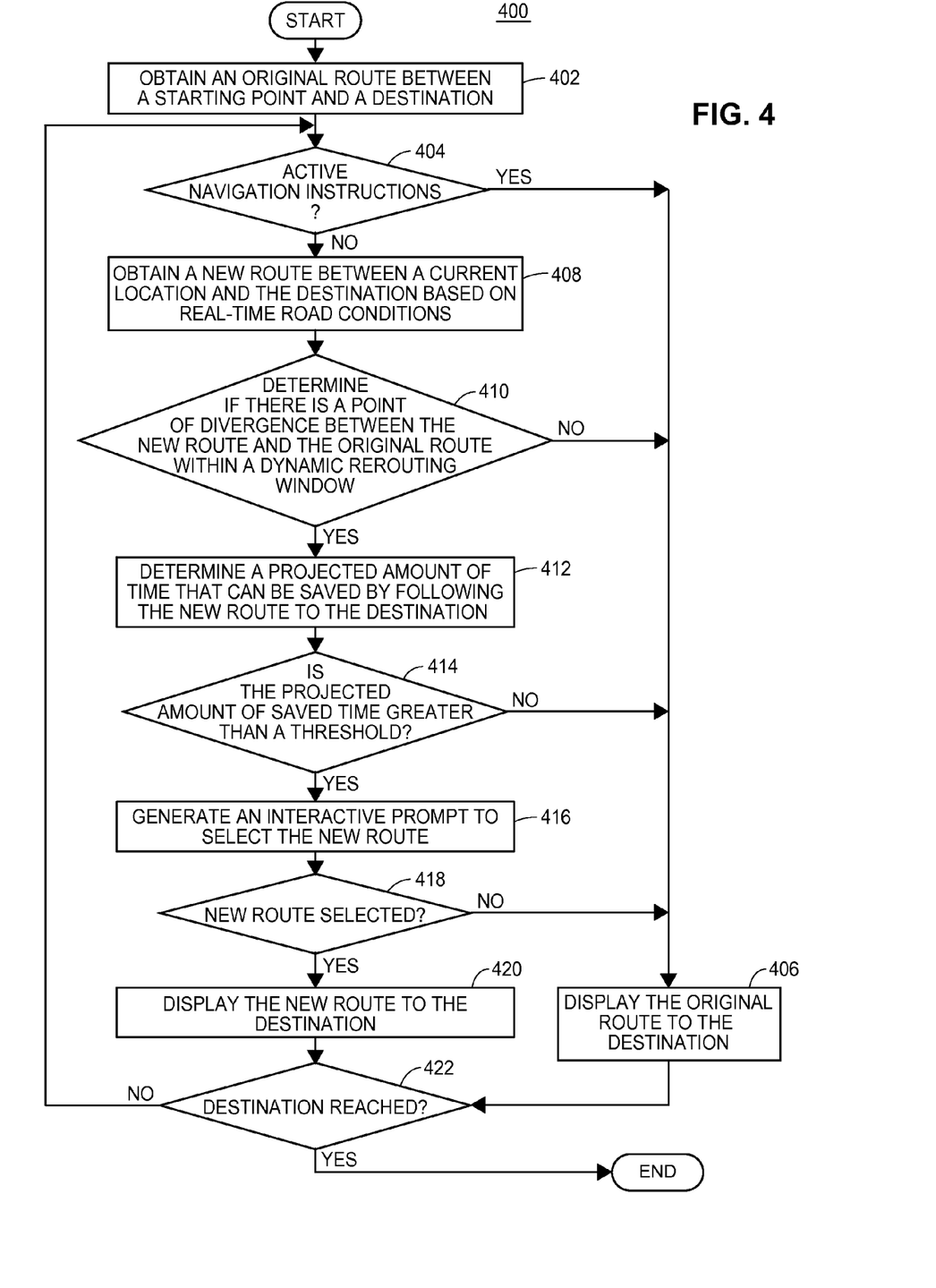
FIG. 4 is a flow diagram of an example method for providing dynamic rerouting during an ongoing navigation session in a mapping module.

To further illustrate the techniques of providing dynamic rerouting, an example method which a mapping/navigation software module operating on a computing device may implement is discussed next with reference to FIG. 4. In an example implementation, the method of FIG. 4 is implemented in the mapping/navigation software module 30 executing on the computing device 12. More generally, however, the method can be implemented in any suitable software application or module, and can be implemented as sets of instructions stored on a computer-readable medium and executable on one or more processors.

The flow diagram of FIG. 4 illustrates an example method 400 for providing dynamic rerouting during an ongoing navigation session. At block 402, an original route is obtained between a starting point and a destination on a digital map. The original route may be displayed on the map that is shown on a touchscreen of a computing device, for example.

Next, at block 404, the method 400 may provide navigation instructions for step-by-step directions (e.g., driving directions, biking directions, etc.) to go from the starting point to the destination. In an example implementation, the navigation instructions may be a series of voice guided instructions (e.g., "turn left", "turn right", etc.). The method 400 also checks to determine an amount of time until the next instruction event. If the amount of time is less than a certain threshold (e.g., 30 seconds), then method 400 proceeds to block 406, where the method 400 continues to show the original route to the destination. In this manner, the method 400 does not attempt dynamic rerouting during active navigation instructions. This is necessary for safety and ease of use purposes, as rerouting decisions should not be made while active navigation instructions are being provided.

If active instructions are not being provided, the method 400 moves to block 408. At the block 408, the method 400 periodically checks for current road conditions such as traffic, road closures, accidents, etc. Based on the current road conditions, a new route between a current location and the destination is obtained. However, it should be noted that the method 400 may not obtain a new route if the current road conditions are deemed normal or not adverse, or if a new route is not available. Once the new route is obtained, the method 400 moves to block 410.

At the block 410, the method 400 determines if there exists a point of divergence between the new route and the original route within a dynamic rerouting window. To find the point of divergence, the method 400 converts both the new route and the original route into two polylines that are made up of a series of discrete points. The method 400 then compares sections of the two polylines within the dynamic rerouting window on a point-by-point basis. If the points do not diverge within the dynamic rerouting window, then the method 400 proceeds to the block 406, where the method 400 continues to show the original route to the destination. However, if the points do begin to diverge within the dynamic rerouting window, then the method 400 finds the point of divergence and moves to block 412.

In an alternate implementation, the method 400 does not convert the routes into polylines in order to find the point of divergence. Instead, the method 400 estimates two points: a first point that corresponds to the leading edge of the dynamic rerouting window and a second point that corresponds to the trailing edge of the dynamic rerouting window. The method 400 then transmits the first point and the second point to a server where information about the original route and the new route are stored. Subsequently, if the server determines that both the first and second points lie along the original route and the new route, then the point of divergence does not exist within the dynamic rerouting window. If, however, the server determines that the first point lies only on the original route and not on the new route, but the second point lies on the original route and the new route, then the point of divergence must exist within the dynamic rerouting window. Accordingly, the device that implements the method 400 may receive a message from the server indicating whether the point of divergence is within the dynamic rerouting window. One example advantage of this implementation is that the method 400 does not need to perform polyline conversions. This in turn makes it easier to determine the point of divergence at block 410, as the method 400 only needs to provide two points to the server.

At the block 412, the method 400 measures the divergence between the new route and the original route, and weighs the degree of divergence against an amount of time that can be saved or lost. The result is determined as a projected amount of time that can be saved by using the new route.

Next, at block 414, the method 400 determines whether the projected amount of saved time is greater than a predetermined threshold value. If the projected amount of saved time is not greater than the threshold value, then the method 400 moves to the block 406. However, if the projected amount of saved time is greater than threshold value, then the method 400 moves to block 416.

At the block 416, the method 400 generates an interactive prompt to enable a user to select the new route if desired. Subsequently, at block 418, if the new route is selected, then the method 400 moves to block 420, where the method 400 shows the new route to the destination. On the other hand, if the new route is not selected, then the method 400 proceeds to the block 406 to continue to show the original route to the destination.

Both the blocks 406 and 420 proceed to block 422, where the method determines if the destination has been reached. If so, the method 400 ends. However, if the destination has not been reached, then the method 400 moves to the beginning of the block 404 to repeat the process.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components or modules. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some embodiments, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for providing dynamic rerouting during an ongoing navigation session through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for providing dynamic rerouting notifications, the method comprising:
   generating, by one or more processors, initial navigation directions to guide a vehicle along an initial route between an origin and a destination;
   when the vehicle is at a current location on the initial route, determining, by the one or more processors, an alternate route to the destination, including determining a point of divergence between the initial route and the alternate route;
   determining, by the one or more processors, boundaries of a dynamic rerouting window in response to having determined the point of divergence, including determining the boundaries based on (i) a current speed of the vehicle and (ii) the current location of the vehicle with respect to the point of divergence; and
   when the point of divergence is within the dynamic rerouting window, generating, by the one or more processors, an interactive prompt to suggest that the alternate route be selected, wherein the interactive prompt is not generated when the point of divergence is outside the dynamic rerouting window.

2. The method of claim 1, wherein generating the interactive prompt further includes:
   determining, by the one or more processors, a projected amount of time saved by selecting the alternate route,
   wherein generating the interactive prompt is in response to determining that the projected amount of time is above a threshold value.

3. The method of claim 2, wherein generating the interactive prompt further includes:
   determining, by the one or more processors, a difference in distances to the destination along the initial route and the alternate route,
   wherein the threshold value is a first threshold value, and
   wherein generating the interactive prompt is in response to determining that the difference in distances is below a second threshold value.

4. The method of claim 1, wherein determining the alternate route to the destination includes periodically checking, by the one or more processors, adverse conditions along the initial route, wherein the adverse conditions include one or more heavy traffic, lane closures, reported accidents, and adverse weather.

5. The method of claim 1, wherein determining the boundaries of the dynamic rerouting window includes:
   determining, by the one or more processors, a leading edge of the dynamic rerouting window corresponding to a projected position of the vehicle after a first predetermined period of time, at a current speed of the vehicle, and
   determining, by the one or more processors, a trailing edge of the dynamic rerouting window corresponding to a projected position of the vehicle after a second predetermined period of time, at the current speed of the vehicle.

6. The method of claim 5, further comprising:
   transmitting, by the one or more processors, the leading edge and the trailing edge of the dynamic rerouting window to a server, and
   receiving, by the one or more processors, an indication of whether the point of divergence is within the dynamic rerouting window, in response to the transmission of the leading edge and the trailing edge.

7. The method of claim 1, further comprising:
   generating, by the one or more processors, a first polyline made up of a first sequence of points to represent the original route;
   generating, by the one or more processors, a second polyline made up of a second sequence of points to represent the alternate route; and
   comparing, by the one or more processors, the first sequence to the second sequence to determine the point of divergence.

8. The method of claim 1, further comprising:
   receiving a confirmation via the interactive prompt that the alternate route has been selected; and
   providing navigation directions to guide the vehicle along the alternate route to the destination.

9. The method of claim 1, wherein the initial navigation directions include a sequence of instructions provided as the vehicle follows the initial route, the method further comprising:
   determining, by the one or more processors, an amount of time remaining until a next one in the sequence of instructions is to be provided;
   wherein generating the interactive prompt is further in response to determining that the amount of time is above a threshold value.

10. A non-transitory computer-readable medium storing thereon instructions for providing dynamic rerouting notifications, wherein the instructions, when executed on one or more processors, cause the one or more processors to:
    generate initial navigation directions to guide a vehicle along an initial route between an origin and a destination;
    when the vehicle is at a current location on the initial route, determine an alternate route to the destination, including determining a point of divergence between the initial route and the alternate route;
    determine boundaries of a dynamic rerouting window in response to having determined the point of divergence, including determining the boundaries based on (i) a current speed of the vehicle and (ii) the current location of the vehicle with respect to the point of divergence; and
    when the point of divergence is within the dynamic rerouting window, generate an interactive prompt to suggest that the alternate route be selected, wherein the interactive prompt is not generated when the point of divergence is outside the dynamic rerouting window.

11. The computer-readable medium of claim 10, wherein to generate the interactive prompt, the instructions further cause the one or more processors to:
    determine a projected amount of time saved by selecting the alternate route,
    wherein generating the interactive prompt is in response to determining that the projected amount of time is above a threshold value.

12. The computer-readable medium of claim 11, wherein to generate the interactive prompt, the instructions further cause the one or more processors to:
    determine a difference in distances to the destination along the initial route and the alternate route,
    wherein the threshold value is a first threshold value, and
    wherein generating the interactive prompt is in response to determining that the difference in distances is below a second threshold value.

13. The computer-readable medium of claim 10, wherein to determine the alternate route to the destination, the instructions cause the one or more processors to periodically check adverse conditions along the initial route, wherein the adverse conditions include one or more heavy traffic, lane closures, reported accidents, and adverse weather.

14. The computer-readable medium of claim 10, wherein to determine the boundaries of the dynamic rerouting window, the instructions further cause the one or more processors to:
   determine a leading edge of the dynamic rerouting window corresponding to a projected position of the vehicle after a first predetermined period of time, at a current speed of the vehicle, and
   determine a trailing edge of the dynamic rerouting window corresponding to a projected position of the vehicle after a second predetermined period of time, at the current speed of the vehicle.

15. The computer-readable medium of claim 10, wherein the instructions further cause the one or more processors to:
   generate a first polyline made up of a first sequence of points to represent the original route;
   generate second polyline up of a second sequence of points to represent the alternate route; and
   compare the first sequence to the second sequence to determine the point of divergence.

16. The computer-readable medium of claim 10, wherein the instructions further cause the one or more processors to:
   receive a confirmation via the interactive prompt that the alternate route has been selected; and
   provide navigation directions to guide the vehicle along the alternate route to the destination.

17. The computer-readable medium of claim 10, wherein the initial navigation directions include a sequence of instructions provided as the vehicle follows the initial route, and wherein the instructions further cause the one or more processors to:
   determine an amount of time remaining until a next one in the sequence of instructions is to be provided;
   wherein generating the interactive prompt is further in response to determining that the amount of time is above a threshold value.

18. A computing device comprising:
   a user interface configured to receive user input and provide output;
   one or more processors; and
   a non-transitory computer-readable medium storing thereon instructions for providing dynamic rerouting notifications, wherein the instructions, when executed on one or more processors, cause the computing device to:
      generate initial navigation directions to guide a vehicle along an initial route between an origin and a destination;
      when the vehicle is at a current location on the initial route, determine an alternate route to the destination, including determining a point of divergence between the initial route and the alternate route;
      determine boundaries of a dynamic rerouting window in response to having determined the point of divergence, including determining the boundaries based on (i) a current speed of the vehicle and (ii) the current location of the vehicle with respect to the point of divergence; and
      when the point of divergence is within the dynamic rerouting window, generate an interactive prompt to suggest that the alternate route be selected, wherein the interactive prompt is not generated when the point of divergence is outside the dynamic rerouting window.

19. The computing device of claim 18, wherein the user interface includes an audio speaker to provide voice announcements to a user.

20. The computing device of claim 18, wherein to generate the interactive prompt, the instructions further cause the computing device to:
   determine a projected amount of time saved by selecting the alternate route,
   wherein generating the interactive prompt is in response to determining that the projected amount of time is above a threshold value.

21. The computing device of claim 20, wherein to generate the interactive prompt, the instructions further cause the computing device to:
   determine a difference in distances to the destination along the initial route and the alternate route,
   wherein the threshold value is a first threshold value, and
   wherein generating the interactive prompt is in response to determining that the difference in distances is below a second threshold value.

* * * * *